L. K. SMITH.
GREASE HOLDER FOR JOURNAL BOXES.
APPLICATION FILED APR. 23, 1912.
1,079,446.
Patented Nov. 25, 1913.
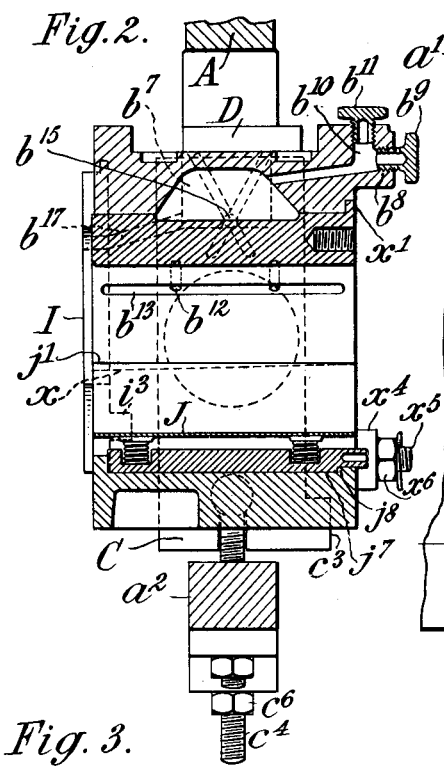
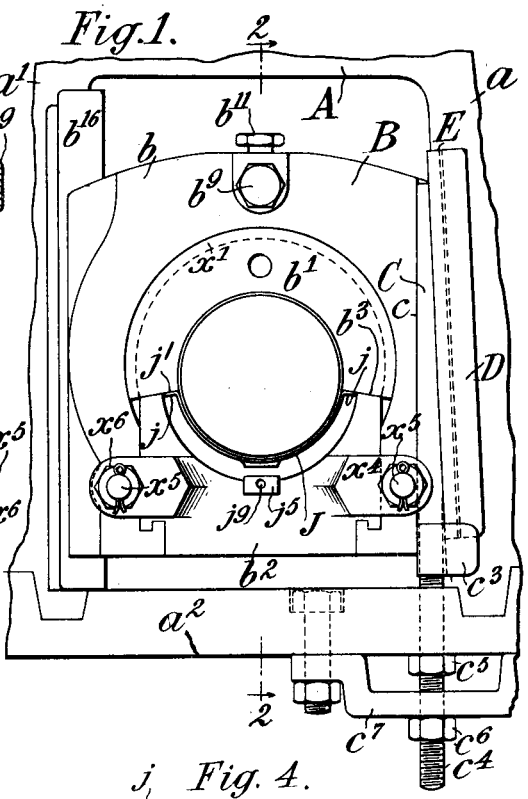
INVENTOR:
Luther K. Smith,
By Attorneys
Fraser, Smith & Myers
WITNESSES:
René Pruine
Fred White

UNITED STATES PATENT OFFICE.

LUTHER KELLER SMITH, OF MOBERLY, MISSOURI, ASSIGNOR TO AUGUSTUS CRANE BUZBY, OF PHILADELPHIA, PENNSYLVANIA.

GREASE-HOLDER FOR JOURNAL-BOXES.

1,079,446.  Specification of Letters Patent.  Patented Nov. 25, 1913.

Original application filed February 2, 1912, Serial No. 674,861. Divided and this application filed April 23, 1912. Serial No. 692,672.

*To all whom it may concern:*

Be it known that I, LUTHER K. SMITH, a citizen of the United States, residing in Moberly, in the county of Randolph and State of Missouri, have invented certain new and useful Improvements in Grease-Holders for Journal-Boxes, of which the following is a specification.

My invention relates to journal boxes especially adapted to the journals of locomotive driving wheels and other similar heavy journals and has for its object to produce a new and improved grease holder and dust guard for such journal boxes. The said devices are illustrated in this application in connection with a journal bearing of the character of that illustrated in Patent No. 941,661, issued to me November 30th, 1909, but they are not confined in use to a journal bearing of this description.

The invention forming the subject matter of the present application is a division of a former application filed by me February 2, 1912, Serial No. 674,861.

The object of the present invention is to provide a structure which shall be simple in construction, which shall be economical, efficient and durable in use, which shall at all times present a thin film of grease to the axle, which shall avoid friction, and which shall prevent the access of dust to the axle, and a further and most important object to be accomplished is to provide a construction wherein the parts may be removed for adjustment or replacement without dismantling a locomotive engine if they are applied thereto, or sending the said engine to the repair-shop whereby the usefulness of the engine is greatly increased.

In achieving the foregoing objects my invention consists in constructing a grease holder and dust guard which is adapted to catch all the grease coming from the top of the journal and to fit snugly to the journal, causing a film of clear grease to be held against the journal at all times without friction; also to form a dust guard which will prevent any foreign substances from getting on the journal and to so construct the said grease holder and dust guard that it shall not touch the journal and that it may easily be removed for repair or replacement without taking out the cellar block.

In the accompanying drawings illustrating a desirable construction of a journal box in connection with which my invention is illustrated,—Figure 1 is a face view of a journal bearing embodying my invention. Fig. 2 is a vertical section thereof on the line 2—2, Fig. 1, looking toward the right. Fig. 3 is a rear elevation of the journal bearing, partly broken. Fig. 4 is a side elevation of the grease holder and dust guard separated. Fig. 5 is an end elevation thereof. Figs. 6, 7, and 8 are detail views of a key employed in connection with the said grease holder.

My invention is capable of use in connection with a large number of constructions of journal box. I have illustrated it as applied to a construction such as that shown in my Patent No. 941,661.

A wedge C is employed for the purpose of taking up the wear between the journal box and the pedestal jaws and preventing lateral movement of the journal box. This wedge and its associated parts are not herein claimed, but are claimed in Patent No. 1,046,032, dated December 3, 1912. I have also illustrated in the drawings of the said patent a removable hub liner composed of two parts I, each of which has a flange $i$. The construction of hub liner is not claimed in this application, but is claimed in a separate application filed by me April 23, 1912, Serial No. 692,671.

The improved grease holder and dust guard provided according to my present invention comprises a plate J which is preferably curved transversely to correspond with the curvature of the journal. It is provided with longitudinal flanges $j$ which are adapted to slide freely under the projecting edges of the brass $b'$ as shown at $j'$ (Fig. 1), where they are received in grooves $j^{12}$ in the brass. The object of the said over-hanging flanges is to catch all of the grease that comes from the top of the journal. The concave side of the said grease holder J is formed with the same curvature as the journal to cause a film of pure grease to be held against the journal at all times, and this also forms a dust guard preventing any foreign substances from getting on the journal. Means are provided for insuring that the plate J shall be at all times held in proper position when in use, which means are adapted to permit removal of the said plate J when desired for repair or substitution of a new plate. For this purpose the grease holder J has preferably formed upon its under side two dowel pins $j^2$ which are adapted to receive two helical springs $j^3$, and serve to hold the said springs in place. These springs have seats in recesses $j^4$ in a sliding key $j^5$. The said springs serve to hold the grease holder against the journal and also hold the said grease holder key $j^5$ in place in the cellar block. The said key $j^5$ serves the purpose of holding the dust guard in place and of permitting its removal when desired. For this reason it has a shoulder $j^6$ on its under side. The said key is received in a recess $j^7$ in the cellar block, and the said recess $j^7$ has a corresponding shoulder $j^8$. The key may have an opening $j^9$ in its end to permit the insertion of a tool for the purpose of removing the same. When it is desired to remove the grease holder a tool is inserted in the opening $j^9$ and the said key is lifted, thereby clearing the shoulder $j^8$ and compressing the springs $j^3$, so that the dowels $j^2$ will pass into recesses $j^4$. Thereupon the key may easily be slid out of place, carrying with it the grease holder. The said parts are so adjusted preferably that the dowels shall at all times be contained within the recesses $j^4$ whereby the grease holder is held in proper position. The said grease holder presents an important advantage in that it does not touch the journal and thereby no friction ensues. Further that it preserves a thin film of pure grease between the journal and the sheet at all times, and that it is absolutely dust-proof. A further and important advantage of the construction illustrated is that the grease holder and dust guard J may be withdrawn without dismantling the engine or disturbing the journal box in any way for the purpose of repair or replacement by a fresh grease holder.

While I have described with great particularity the detail features of construction of the said invention, it will be apparent that the invention is not in all things limited to such particular details or structural formation, and that equivalent devices may be employed and changes made therein within the limits of the appended claims.

What I claim is:—

1. In a journal bearing, the combination of a bearing brass and a cellar having meeting edges, said bearing brass having longitudinal grooves in the bottom thereof, the tops of which are out of alinement with the said meeting edges, and a dust guard and grease holder having its side edge extending upwardly into the said grooves.

2. In a journal bearing, the combination of a bearing brass and a cellar having meeting edges, said bearing brass having a journal fitting recess and grooves in the portions between the recess and side faces, the tops of which are out of alinement with the said meeting edges, and a dust guard and grease holder having its side edge extending into the said grooves.

3. In a journal bearing, the combination of a bearing brass and a cellar having meeting edges, said bearing brass having a journal fitting recess and grooves in its bottom laterally of the said recess, the tops of which are out of alinement with the said meeting edges, and dust guard and grease holder supported on the cellar with its side edge entered in the grooves of the bearing brass.

4. In a journal bearing, the combination with a journal of a bearing body having an open front, a brass therein over the journal and having grooves in its bottom, a cellar under the journal, the meeting edges of said brass and cellar being out of alinement with the top of said groove, and a dust guard and grease holder disposed between the journal and cellar with its side edges in the said grooves of the brass, and a key mounted in said cellar and having a spring connection with said guard and holder, said guard and holder adapted to be removed from the body through the open front thereof by the removal of said key, while the journal, cellar and brass remain in position.

In witness whereof, I have hereunto signed my name in the presence of two subscribing witnesses.

LUTHER KELLER SMITH.

Witnesses:
W. E. LUTES,
R. B. BROWNING.

---

Copies of this patent may be obtained for five cents each, by addressing the "Commissioner of Patents, Washington, D. C."